US012583125B2

(12) United States Patent
Paquet et al.

(10) Patent No.: US 12,583,125 B2
(45) Date of Patent: Mar. 24, 2026

(54) MARINE LOADING SYSTEM WITH AUTOMATIC MOVEMENT CONTROL, AND ASSOCIATED METHOD

(71) Applicant: T.EN LOADING SYSTEMS, Sens (FR)

(72) Inventors: Stephane Paquet, Voisines (FR); Pascal Montcourant, Lixy (FR)

(73) Assignee: T.EN LOADING SYSTEMS, Sens (FR)

( * ) Notice: Subject to any disclaimer, the term of this patent is extended or adjusted under 35 U.S.C. 154(b) by 0 days.

(21) Appl. No.: 18/723,456

(22) PCT Filed: Dec. 20, 2022

(86) PCT No.: PCT/FR2022/052448
§ 371 (c)(1),
(2) Date: Jun. 23, 2024

(87) PCT Pub. No.: WO2023/118737
PCT Pub. Date: Jun. 29, 2023

(65) Prior Publication Data
US 2025/0058472 A1 Feb. 20, 2025

(30) Foreign Application Priority Data
Dec. 23, 2021 (FR) ..................................... 2114449

(51) Int. Cl.
*B67D 9/02* (2010.01)
*B25J 9/16* (2006.01)
*B25J 13/08* (2006.01)
(52) U.S. Cl.
CPC .......... *B25J 9/1697* (2013.01); *B25J 13/089* (2013.01); *B67D 9/02* (2013.01)

(58) Field of Classification Search
CPC .......... B25J 9/1697; B25J 13/089; B67D 9/02
See application file for complete search history.

(56) References Cited

U.S. PATENT DOCUMENTS

| | | | |
|---|---|---|---|
| 2019/0084824 A1* | 3/2019 | Vannesson | ............. B63B 27/00 |
| 2021/0147216 A1* | 5/2021 | Yousfi | .................... B63B 27/24 |
| 2021/0214051 A1 | 7/2021 | de Jonge et al. | |

FOREIGN PATENT DOCUMENTS

| | | |
|---|---|---|
| FR | 2813872 A1 | 3/2002 |
| FR | 2854156 A1 | 10/2004 |

(Continued)

OTHER PUBLICATIONS

International Search Report and Written Opinion, of the European Patent Office, as ISA, mailed Mar. 28, 2023, in corresponding International Patent Application PCT/FR2022/052448.

*Primary Examiner* — Jason K Niesz
(74) *Attorney, Agent, or Firm* — Troutman Pepper Locke LLP; Gabrielle L. Gelozin

(57) ABSTRACT

The invention relates to a marine loading system including: an arm having a coupling system for connection to a target manifold for fluid transfer, the manifold and a target located adjacent to the manifold each having tracking means designed to make it possible to determine a relative position; actuators for controlling the movement of the arm in space; optical means supported by the coupling system and suitable for transmitting images of the tracking means; means for controlling the actuators provided on the arm; and computing means for calculating a movement trajectory of the arm towards the manifold on the basis the images of the tracking means of the target and of the manifold, transmitted by the optical means, and for generating control instructions determined on the basis of the calculated trajectory and transmitting said instructions to the control means.

16 Claims, 5 Drawing Sheets

(56)        References Cited

FOREIGN PATENT DOCUMENTS

| | | | |
|---|---|---|---|
| FR | 2931451 | A1 | 11/2009 |
| FR | 2964093 | A1 | 3/2012 |
| FR | 2975368 | A1 | 11/2012 |
| FR | 3003855 | A1 | 10/2014 |
| WO | 2020163288 | A2 | 8/2020 |

* cited by examiner

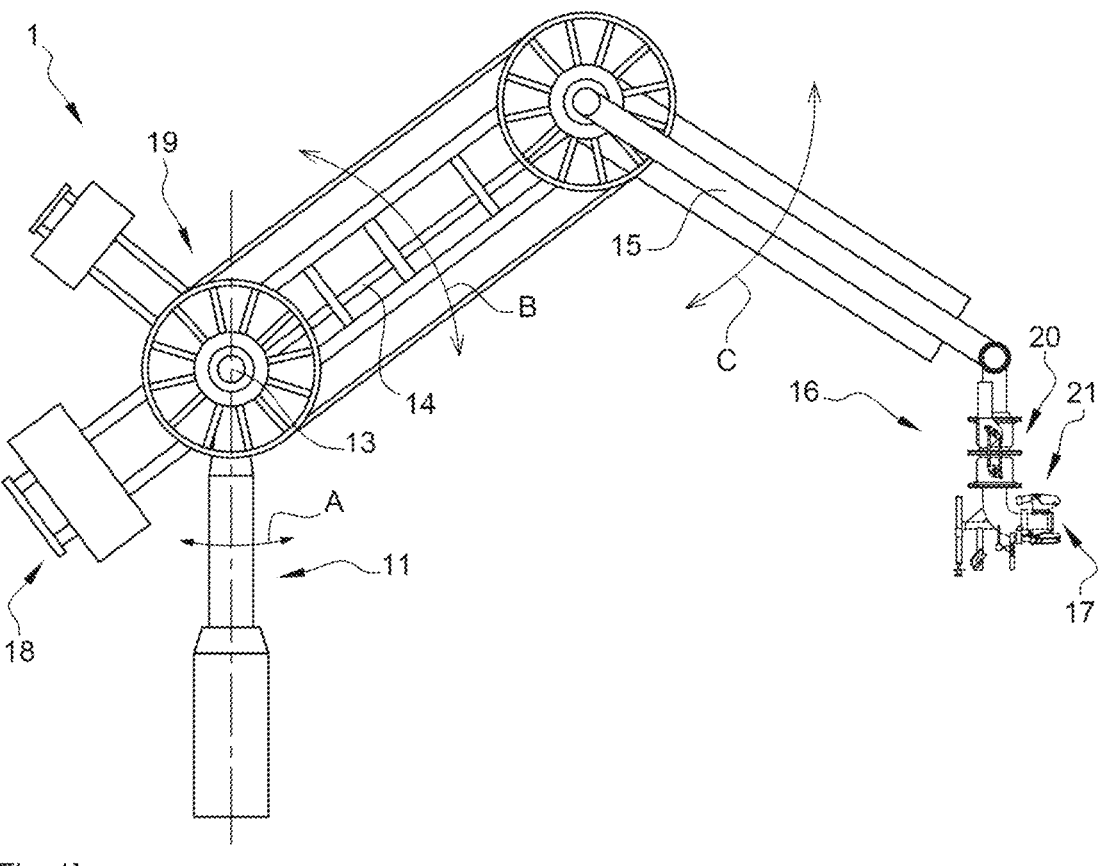
[Fig. 1]
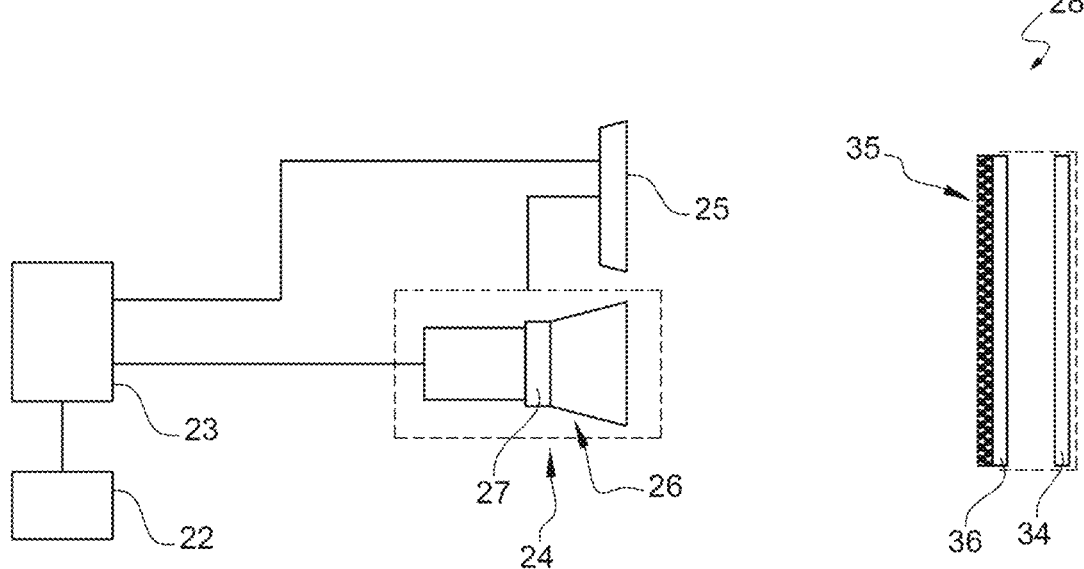
[Fig. 2]

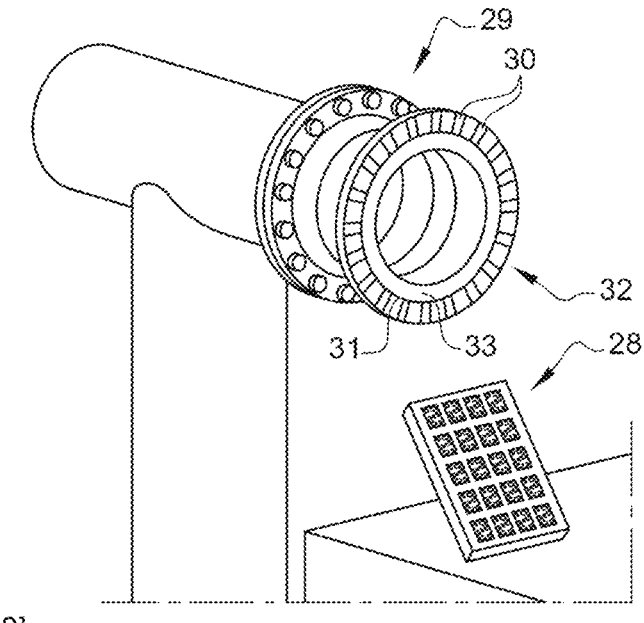
[Fig. 3]
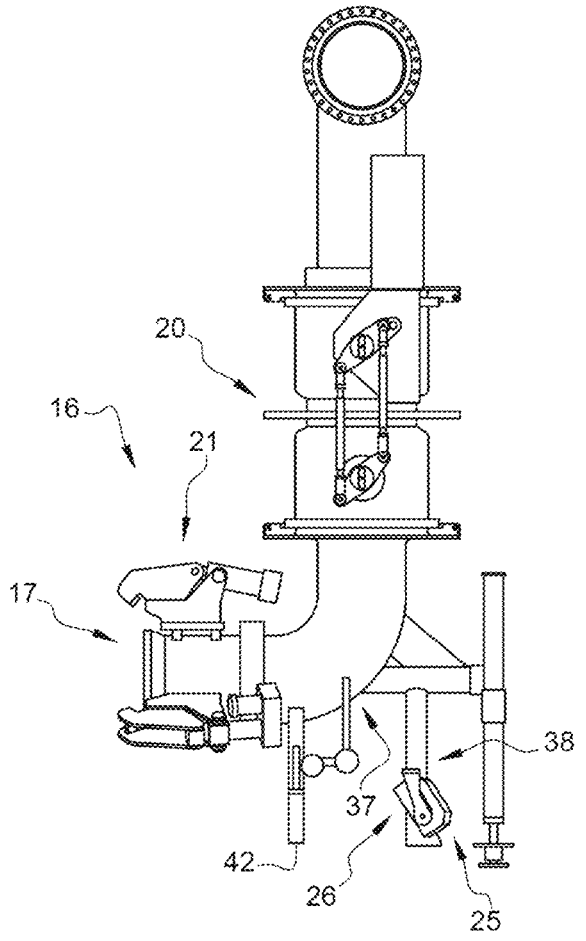
[Fig. 4]

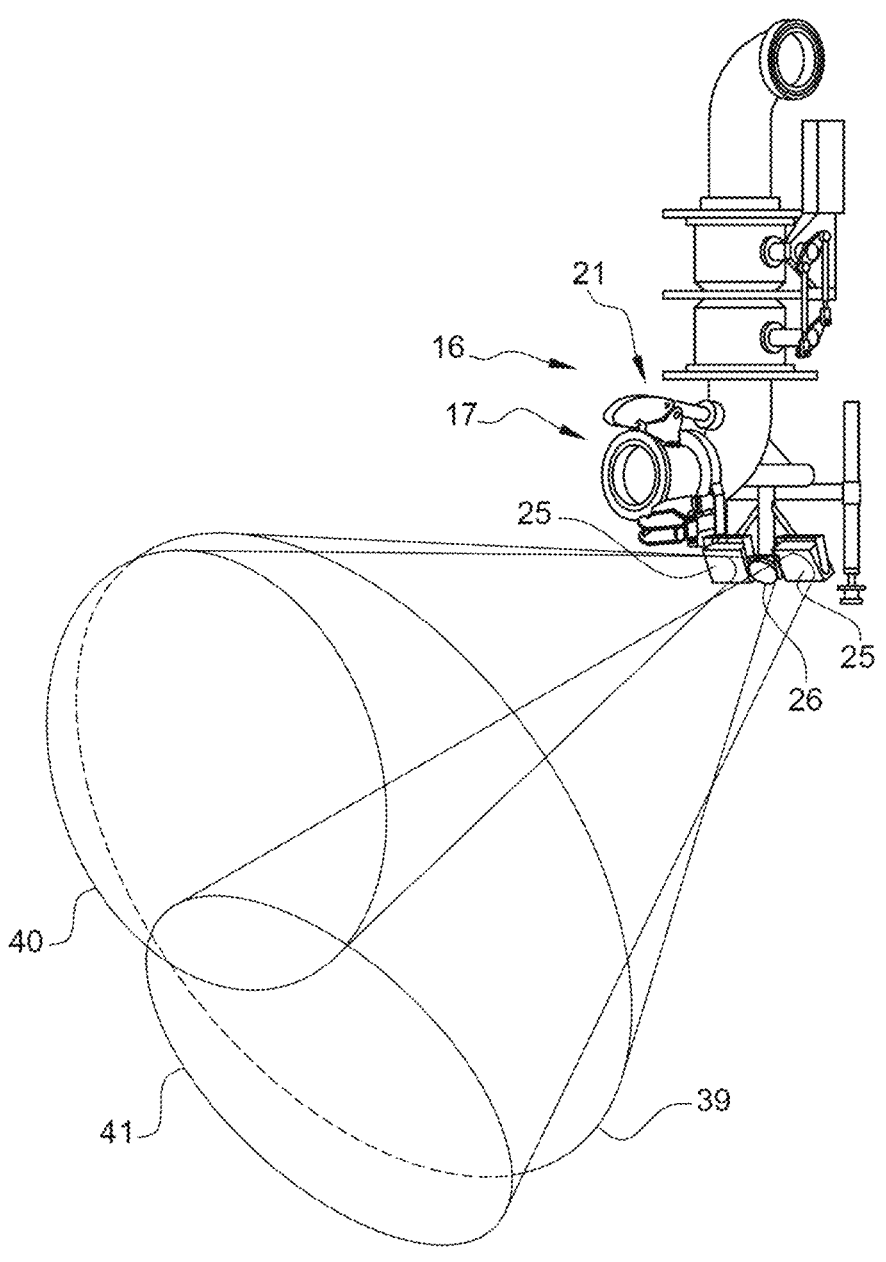
[Fig. 5]

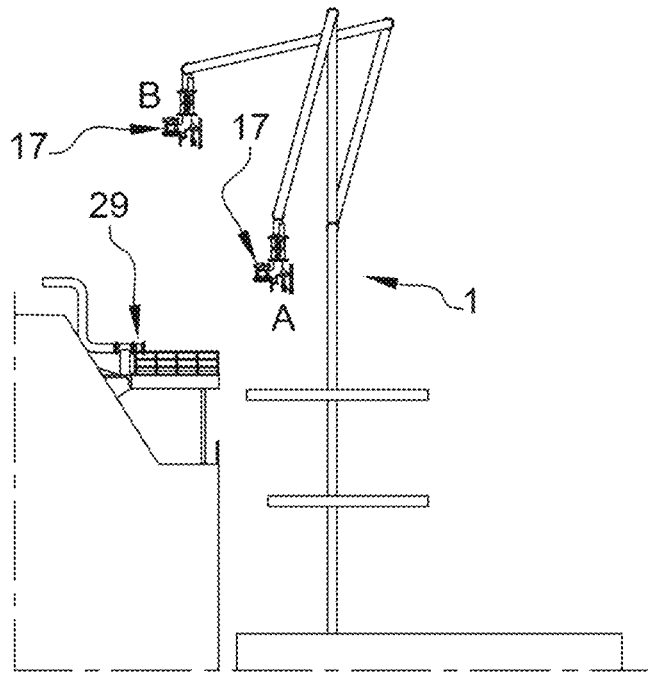
[Fig. 6a]
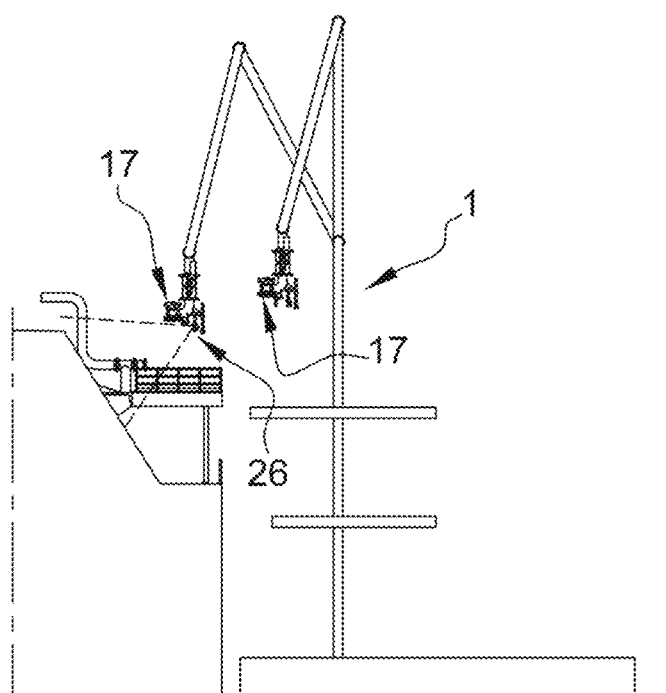
[Fig. 6b]

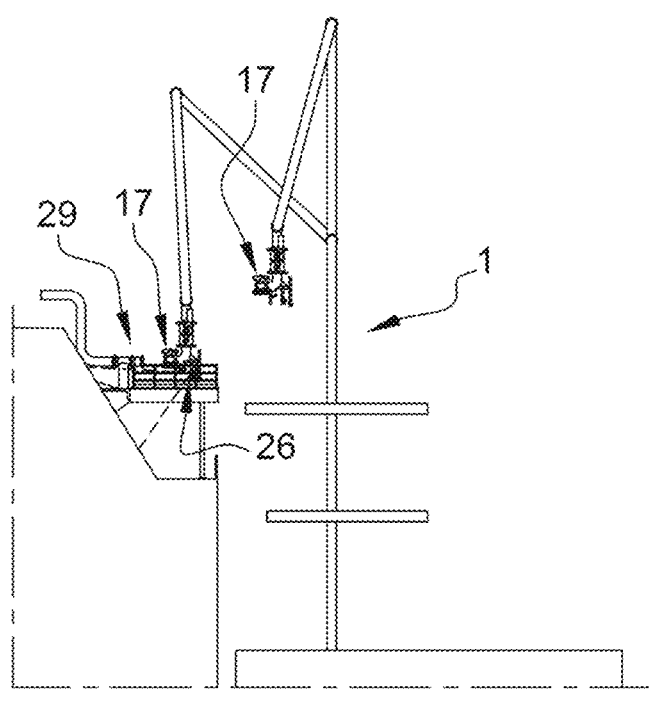
[Fig. 6c]
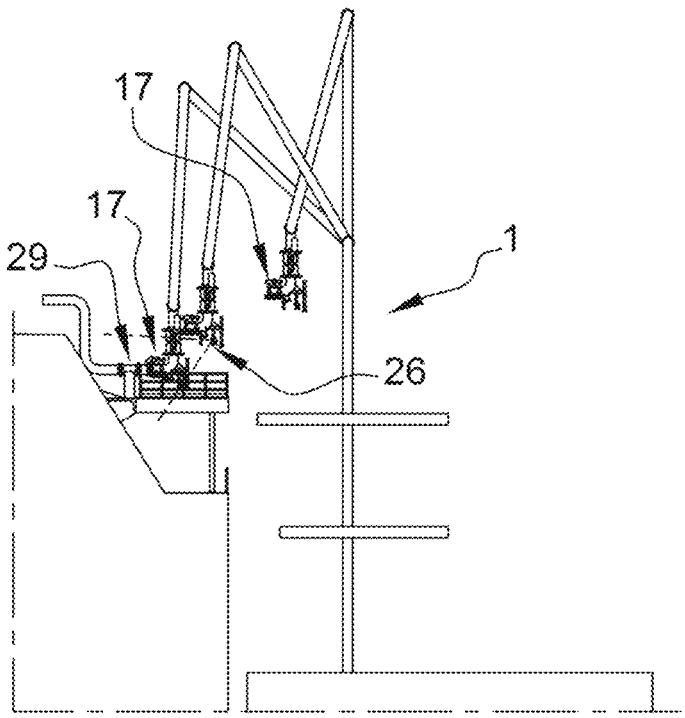
[Fig. 6d]

MARINE LOADING SYSTEM WITH AUTOMATIC MOVEMENT CONTROL, AND ASSOCIATED METHOD

CROSS-REFERENCE TO RELATED APPLICATIONS

This application is a 371 National Stage entry of International Patent Application No. PCT/FR2022/052448, filed Dec. 20, 2022, which claims priority to French Patent Application No. FR2114449, filed Dec. 23, 2021, the entire content of both applications are incorporated by reference in their entirety.

TECHNICAL FIELD OF THE INVENTION

The invention relates, in a general manner, to a marine loading system including articulated arms for transferring a fluid from one location to another, and an associated method.

The term "fluid" shall mean a liquid or gaseous product. More particularly, it involves liquefied natural gas, low-pressure and high-pressure natural gas, petroleum products or chemicals transferred between a ship and a quay or between two ships.

More particularly, the present invention relates to the automatic movement control of such an arm towards a target manifold to which it is intended to be connected.

PRIOR ART

In general, such an arm includes an articulated pipework, mounted on a support, connected to a fluid supply pipework, and on which is mounted a first tube, referred to as the internal tube, via a portion of tube bent through 90 degrees, enabling one of its ends to rotate about a vertical axis, and the other end about the horizontal axis. At the opposite end of the internal tube, a second tube, referred to as the external tube, is mounted to rotate about a horizontal axis. A coupling system is mounted at the end of the external tube.

The coupling system thus has at least 3 degrees of freedom in space with respect to the support and the movements about each of these degrees of freedom are controlled by hydraulic, electric or pneumatic actuators, such as cylinders or motors.

Such arms are known, for example, from patents FR2813872, FR2854156, FR2931451, FR2964093 and FR3003855.

In the case of an automatic connection procedure, such as that of the arm of patent application FR2931451, the calculation of the movement trajectory of the arm towards the target manifold includes calculating the relative position of the coupling system with respect to the target manifold as a function of information supplied by the position information supply means of the coupling system with respect to a target.

According to an embodiment, these information supply means include a camera mounted on the coupling system.

The target is disposed on the target manifold at a predefined position. The camera is designed to focus on the target and to supply an image of the target to a computer. On the basis of this image, the computer is able to calculate the relative position of the coupling system with respect to the target manifold.

For performance reasons, the target is preferably a reflective sight. It is also possible to take the free end of the target manifold itself as target.

In practice, one or more fiducial markers are used as targets. Each contains an identifier enabling certainty that it is indeed a marker. Then, the computer analyses the image in order to determine the position and orientation (6 degrees of freedom) of the marker with respect to the camera. Preferably, there is a plurality of markers in order to have redundancy and increase precision. The position of the target with respect to the target manifold must therefore be known precisely, in order to be able to calculate the position of the target manifold on the basis of the position measurement of the target. It is therefore crucial that the target is positioned in a very precise manner on the target manifold in order that the connection procedure can be correctly performed.

This proves even more critical when the target is removable in order to be able to be used on different target manifolds and must be put in place by an operator for each connection procedure.

Furthermore, it is necessary to provide as many targets as there are target manifold models to be equipped.

In addition, vision systems currently in use are sensitive to ambient luminosity, shadows, glare and reflections.

The aim of the present invention is to solve at least one of the above-mentioned disadvantages.

It aims, more particularly, to propose a marine loading system for which the connection procedure makes it possible to dispense with precise positioning of the target with respect to the target manifold.

DISCLOSURE OF THE INVENTION

For this purpose, the present invention proposes a marine loading system including an articulated fluid transfer arm having a fluid transfer line provided at one of its ends corresponding to a free end, with a coupling system suitable for being connected to a target manifold for fluid transfer, the target manifold and a target located adjacent to the target manifold each having tracking means designed to enable a relative position to be determined; actuators for controlling the movement of the arm in space; optical means supported by the coupling system and suitable for transmitting images of the tracking means; means for controlling the actuators provided on the arm; and computing means suitable for calculating a movement trajectory of the arm towards the target manifold on the basis of the images of the tracking means of the target and of the target manifold transmitted by the optical means, and for generating control instructions determined on the basis of the calculated trajectory and transmitting said instructions to the control means.

The use of tracking means enables a relative position to be determined, both on a target manifold and a target, and enables the latter to be placed close to the target manifold, without it being necessary to comply with a precise positioning.

More specifically, through these tracking means, the computing means can determine both the relative position of the coupling system with respect to the target and the relative position of this coupling system with respect to the target manifold in order to deduce the relative position of the target manifold with respect to the target.

These two positions being determined by the computing means, the precise positioning of the target with respect to the target manifold therefore does not matter.

Furthermore, once the relative position of the target manifold with respect to the target is known, the calculation of the movement trajectory can be made on the basis of the location of the target alone, and the connection procedure can continue even in the absence of the target manifold in the field of view of the optical means.

In addition, through the present invention, the tracking means do not need to be specific to one target manifold and, therefore, the corresponding target can be used with any type of target manifold.

According to other provisions of the present invention which can advantageously be implemented independently or in combination, in particular due to their ease of manufacture or use:

the computing means are suitable for generating and transmitting predefined control instructions in order to produce a first approach of the arm towards the target manifold along a systematic trajectory intended to enable the optical means to detect the target and the target manifold, optionally by being suitable for interacting with a transponder disposed on the target;

to calculate the movement trajectory, the computing means are suitable for successively calculating the relative position of the coupling system with respect to the target, then the relative position of the coupling system with respect to the target manifold;

the tracking means of the target comprise one or more fiducial markers;

the fiducial marker is a binary square fiducial marker designed to enable a relative position determination with 3 degrees of freedom or a relative position and relative orientation determination with 6 degrees of freedom;

the tracking means of the target manifold comprise one or more fiducial markers disposed on a flange of the target manifold or a figure formed by concentric circles, externally and internally limiting the joint face of a flange of the target manifold;

the free end of the arm includes a fiducial marker arranged to enable verification of the calibration of the optical means;

the target includes a retroreflective panel on which the tracking means of the target are disposed;

the optical means include a digital camera;

the digital camera is provided with a fixed neutral density filter or an electronic variable neutral density filter and/or a polarising filter;

the optical means are mounted on the free end of the arm, under the coupling system;

the arm is provided with at least one, optionally dimmable, lighting projector, mounted on the arm beside the optical means;

the arm is provided with two lighting projectors, arranged either side of the optical means and forming upper and lower lighting cones of the field of view of the optical means.

The invention also relates to a method for controlling the movement of at least one articulated fluid transfer arm towards a target manifold, for connection thereto, including the steps of:

taking views of tracking means present on the target manifold to which a coupling system of the articulated fluid transfer arm is intended to be connected and on a target located adjacent to the target manifold;

calculating the relative position of the target with respect to the target manifold on the basis of images from the tracking means of the target and of the target manifold;

calculating a movement trajectory of the arm towards the target manifold on the basis of images from the tracking means of the target; and generating and transmitting control instructions enabling the movement of the arm towards the target manifold to be controlled.

According to other provisions of this method which can advantageously be implemented independently or in combination, in particular due to their ease of manufacture or use:

before the view taking step, movement of the arm is controlled along a systematic trajectory intended to enable the detection, by the optical means, of the target positioned beforehand adjacent to the target manifold;

the systematic trajectory includes at the end of the trajectory, for a first fluid transfer arm, a substantially descending approach movement of the coupling system towards the target associated with the first arm and, for a second arm, a substantially lateral approach movement towards a target associated with the second arm;

the coupling system is pre-positioned at a predetermined height, above the target on the basis of information communicated by a transponder disposed on the target.

BRIEF DESCRIPTION OF THE FIGURES

The description of the invention will now be continued with the detailed description of exemplary embodiments, given below by way of illustration and non-limiting, with reference to the accompanying drawings. In the Drawings:

FIG. 1 is a schematic perspective view of a fluid transfer arm of a marine loading system according to the invention;

FIG. 2 is a block diagram of the operation of the optical means or computing means of the loading system;

FIG. 3 is a schematic perspective view of the target of FIG. 2 and a target manifold to which the loading arm of FIG. 1 is intended to be connected;

FIG. 4 is a schematic elevation view of the free end of the loading arm of FIG. 1;

FIG. 5 is a similar view to FIG. 4 and shows the field of view of the optical means and the lighting cones of the lighting projectors mounted on the loading arm of FIG. 1;

FIGS. 6A to 6D are schematic elevation views illustrating the successive steps of the connection procedure for a loading arm, such as that of FIG. 1.

The FIG. 1 shows, very schematically, an articulated fluid transfer arm of a marine loading system according to the invention. The articulated fluid transfer arm is shown here in a very simplified manner, and in this regard it is recalled that the invention adapts to any articulated fluid transfer arm system, in particular to the fluid transfer arms of the patent applications mentioned above.

In general, this type of loading arm is known per se, and will therefore not be described here in great detail.

The fluid transfer arm of FIG. 1 is a marine loading arm 1 which has a base 11 housing a tube connected to a fluid supply pipe that is located below the surface of the structure on which the base 11 is fixed. It may be a floating structure, such as a ship, or a quay. At the top of the base 11, a curved tube 13 is rotationally articulated, on which a first tube is articulated in turn, referred to as the internal tube 14, on the opposite end of which a second tube is articulated, referred to as the external tube 15. The free end of the external tube supports a coupling assembly 16 also enabling fluid transfer, and the coupling system 17 of which, also called a coupler, is intended to be connected to a target manifold, such as a manifold, disposed for example on a ship, as will be described in more detail below. In the illustrated embodiment, in a manner known per se, the coupler 17 also has three degrees of freedom in rotation with respect to the free end of the external tube 15. These three degrees of rotation are either free, so that an operator can freely adjust the angle of the coupler during the final phase of approach for its connection to the target manifold, or one or more of these rotations are controlled by actuators and connected to a PLC, for fully or partially automatic positioning.

Assemblies formed from rotating connections or joints and elbows are used here, in order to enable the rotations. Here, the rotating joints of these assemblies are cryogenic. Here, there are three rotating joints on the articulated tubular portion 14, 15 and also three on the coupling assembly 16, one of which is motorised (the middle joint).

The arm is also provided, in a manner known per se, with angular sensors (not shown in the figures) for measuring, at each moment in time, the position of the arm (angle of the internal tube 14, angle of the external tube 15, angle of the first rotation after the base and angle of the motorised rotation of the coupling assembly 16, if this is the case).

The articulated tubular portion 14, 15 is here associated with a counterweight balancing system 18, and also associated here with a balancing pantograph type mechanism 19.

At the end of the transfer line provided with the coupling assembly, an emergency release system 20 (ERS) is also provided and a system 21 for quick connection and disconnection of the coupler 17 (QCDC for Quick Connect—Disconnect Coupler).

Three actuators, which are not visible in FIG. 1, are provided for each of the three articulations of the loading arm (symbolised by the double arrows A, B, C) in order to actuate, directly or via a transmission, the internal tube and the external tube and to generate the rotation about a vertical axis.

Here, the three actuators and those which drive the rotating joints of the coupling assembly 16 are hydraulic cylinders. In an alternative which is not illustrated, one or more hydraulic cylinders are replaced by other types of hydraulic, pneumatic or electric actuators: motors, cylinders or any other type of actuator.

As shown in FIG. 2, the marine loading system according to the invention also includes a PLC 22 disposed, in practice, in an electrical control cabinet.

This is, more precisely, a Programmable Logic Controller (PLC). It is suitable for processing the signals received from an image processing unit 23, by means of preprogrammed algorithms. Alternatively, it may involve a data acquisition and computing centre, such as an industrial computer, and more generally a data acquisition and computing device, such as a computer.

The image processing unit 23 together with the PLC 22 forms part of the computing means of the marine loading system according to the invention and is functionally connected to the optical means 24 suitable for transmitting the tracking means images described in more detail below.

This processing unit is also suitable for controlling the optical means 24 and the light projectors 25, of which there are two in practice.

It includes, in particular, a real-time microprocessor combined, if necessary, with an FPGA circuit ("Field Programmable Gate Array"), in other words a network of gates that can be programmed by the user, in order to manage the most time-consuming operations.

More precisely, here, the optical means 24 include a digital camera 26 provided with a variable electronic neutral density filter 27 and the light projectors are of the dimmable type, and are thus all three controlled by the processing unit.

The digital camera 26 is furthermore provided with a polarising filter (not visible in the figures).

When the marine loading system according to the invention includes a plurality of loading arms, the PLC 22 is configured to control them all, and either an image processing unit 23 is provided which is common to the various cameras of the loading arm 1 and housed in the electrical control enclosure with the PLC 22, or one image processing unit 23 per camera, thus disposed in the vicinity of the digital camera.

In a manner that is known per se, and not illustrated in the drawings, pre-actuators connected to a hydraulic supply are provided to supply the actuators with the hydraulic energy necessary for their operation. They are controlled by the PLC. Of course, this is only true in the case where the actuators considered are hydraulic actuators.

Furthermore, a remote control interface for an operator is provided in the case of the present embodiment. Here, it is designed to enable it to give connection or disconnection instructions to the arm by means of a joystick, the movement trajectory of the loading arm 1 being calculated automatically by the PLC 22.

In order to enable the above-defined computing means to be able to calculate the movement trajectory of the loading arm 1 towards the target manifold, and therefore to generate and transmit, to the pre-actuators, control instructions determined as a function of the calculated trajectory, the digital camera 26 takes views of tracking means present, as illustrated in FIG. 3, both on a target 28 and the target manifold 29 to which the coupler 17 of the loading arm 1 is intended to be connected.

The tracking means used in the case of the present embodiment are fiducial markers, such as square binary fiducial markers, or are formed from a combination of points and squares, known per se and already used in the field of petroleum and gas.

Those affixed on the target manifold 29 are also fiducial markers constituted by a geometric figure formed by a succession of radial lines 30 disposed on the perimeter of the circular opening of the target manifold 29.

In practice, they are affixed on an annular plate 31 that is dimensioned and capable of being fixed on a surface of the flange 32 of the target manifold 29, which is located behind a raised joint face 33 of this flange 30.

These markers make it possible to measure 6 degrees of freedom (position and orientation). Alternatively, it is possible to use fiducial markers which only allow 3 degrees of freedom (position) to be measured when in the presence of "onshore" applications with few movements and/or on a ship that is always alongside the quay.

With regard to the fiducial markers of the target manifold 29, they can alternatively be replaced by detection of concentric circles externally and internally limiting the flange 32 of the target manifold 29.

As can also be seen in FIG. 3, the target 28 is placed close to the target manifold 29 (under it), such as for example on the deck of the ship equipped with the target manifold 29.

In the case of the present embodiment as shown in FIG. 2, the target 28 includes a retroreflective panel 34 on which the fiducial markers 35 are disposed.

More precisely, these are opaque fiducial markers fixed on a translucent support 36 provided with an anti-glare and/or anti-reflective treatment.

Alternatively, the opaque fiducial markers 35 can be affixed directly on a retroreflective panel with an anti-glare treatment or, in place of the reflecting panel, the target 28 can be provided with retroreflective elements.

The retroreflective panel 34 can return the light coming from the light projectors 25, directly to the camera 26.

With regard to the optical means used to take images of these fiducial markers, the neutral density filter enables the quantity of light reaching the CCD sensors of the digital camera 26 to be controlled and makes it possible to adequately manage situations where the lighting is too bright for this camera 26.

The power and the beam of the light projectors 25 are chosen, in this regard, so as to provide sufficient lighting of the area of the target 28 to counter, on the one hand, the harmful effects of sunlight, such as shadows, reflections and glare, and on the other hand, the night.

These light projectors 25 are furthermore of the dimmable type, in order to control the lighting level as a function of the environmental conditions (rain, snow, fog, night, sunshine).

In practice, as shown in FIG. 4, the digital camera 26 is mounted on the coupling system 16 and more precisely on the rotating joint and elbow assembly 37 in front of the coupler 17, so as to be located under this and therefore to be easily accessible for maintenance and cleaning purposes.

The mounting is carried out via an electrically insulating connection support 38 and the digital camera 26 is, for its part, housed in an explosion-proof enclosure fixed to this support 38.

The digital camera 26 being placed under the emergency release system, self-ejecting sockets are used when this is connected to the image processing unit 23 by wired connection means.

The light projectors 25 are, for their part, mounted on the same assembly 37, in front of the digital camera 26 and on either side thereof.

As can be seen more clearly in FIG. 5, here the digital camera 26 has a field of view angle delimited by the cone 39, while the two light projectors 25 form an upper lighting cone 40 and a lower lighting cone 41 of the field of view of the camera 26.

In practice, these are two projectors each of 30,000 Lumens.

Since the position of the digital camera 26 with respect to the coupler 17 is determined for the calculation of the movement trajectory of the loading arm 1, and can be disturbed, for example, by an impact, in the context of the present embodiment, an additional fiducial marker 42 is provided in order to confirm the correct calibration of the camera and, therefore, to always start an automatic connection operation with the assurance a correct calibration.

This marker 42 is also mounted on the above-mentioned assembly 37 via a fastener (not visible in the figures), in such a way as to be in the field of view of the camera 26 but without being able to interact with the fiducial markers of the target 28 and of the target manifold 29.

It should also be noted that an ultrasound detector (not visible in the figures) can be arranged on the free end of the loading arm 1 in such a way as to be able to avoid a collision, for example with the deck of a ship carrying the target manifold, in the event of the optical means failing to detect the target. This detector is functionally connected to the computing means.

In practice, the PLC 22 determines, in particular using the optical means and the tracking means, the relative position of the coupler 17 with respect to the target 28 and to the target manifold 29, and in this case also their relative orientation (yaw, roll, pitch), and then generates a movement trajectory of the coupler 17 towards the target manifold 29. It then calculates the control instructions to give to each of the actuators in order to control the movement of the coupler 17 towards the target manifold 29 from the storage position of the arm.

The PLC 22 can also send, in particular in the context of a fully automatic connection procedure, a control instruction to the pre-actuators in order to tighten the coupler 17 on the target manifold 29, then an instruction to disengage the actuators of the arm, so as to release the movements of the arm once the coupler 17 is connected and tightened on the target manifold 29.

For the return to the storage position, the camera 26 it is no longer necessary because the points of departure and arrival are known. The arm is driven using the information from the angular sensors defined above.

In more detail, the process of connecting the loading arm 1 to the target manifold 29 includes, in the case of the present embodiment of the present invention, a first step of generating and transmitting predefined control instructions in order to carry out a first approach of the loading arm towards the target manifold 29, along a systematic trajectory intended to allow the camera 26 to detect the target 28 and then the target manifold 29, or even both at the same time, the target 28 having been position beforehand, adjacent to the target manifold 29. This step is shown in FIGS. 6A and 6B, where the systematic movement trajectory, pre-programmed in the PLC 22, consists of bringing the coupler 17 from a storage position A to a position B located above the area where the target and the target manifold are located. This passage from the storage position A to position B substantially consists, in practice, of moving the coupler 17 upwards and forward, in order to bring it substantially vertically above the area where the target manifold 29 and the target 28 are located.

Then, as illustrated by FIG. 6B, the coupler 17 initiates a downward movement to acquire the target 28, with activation of the camera 26 and the lighting projectors 25.

Here, the angular sensors are also used for the movement of the arm in this acquisition phase of the target.

Once the markers of the target 28 and of the target manifold 29 are in the field of view of the camera, the PLC 22 successively calculates the relative position of the coupler 17 with respect to the target 28 and with respect to the target manifold 29, and deduces from this the relative position of the target manifold 29 with respect to the target 28. As indicated above, here these calculations are also supplemented by relative orientation calculations.

In practice, once the target 28 is detected, the loading arm is controlled to replace it at a systematic position with respect to the target 28. It is in this position that the calibration is then carried out, namely the calculation of the position of the target 28 with respect to the target manifold 29.

The approach movement is then continued in order to bring the coupler opposite the target manifold (FIG. 6C). When the coupler 17 arrives substantially at the height of the target manifold 29, the latter leaves the field of view of the camera 26, as can be seen in FIG. 6C. Nevertheless, due to the calculations mentioned above, the PLC 22 can continue the approach movement on the basis of the detection of the sole target 28.

The angular sensors can also be used for this approach movement, if it is desired to drive the arm for a direct rectilinear movement of the coupler 17, as described, for example, in patent application FR2931451.

Finally, once the coupler 17 is opposite the target manifold 29, the connection between the two is made automatically, as mentioned above.

When the loading system is of the type with a plurality of arms using a vapour return and a plurality of liquid transfer lines, the connection process for the vapour return line is performed first, on the basis of the procedure which has just been described. In the absence of a vapour return, this procedure applies to the first arm of the series. Next, the connection of the liquid transfer lines, such as for liquefied natural gas, is performed by a first systematic approach, which is more direct than the preceding approach, to the target manifold 29 using the height position information of the target manifolds, acquired during the first connexion (cf. the two positions before connection from FIG. 6D).

In practice, this first approach brings the coupler 17 just above and to the side of the target manifold 29, then applies a lateral approach movement for acquisition of a target associated with this second arm. Then, the connection procedure continues in a similar manner to the preceding one.

More specifically, the first arm connected is the arm which serves as a reference for the mooring of the boat. The boat is moored so that the target manifold 29 is opposite the arm. Therefore, a descending movement of the arm enables the target to be detected. For the subsequent arm (and others), the target manifold 29 is not necessarily opposite. By contrast, its elevation is known (via the first connected arm). Therefore, the target 29 is detected following a lateral displacement at the elevation supplied via the first arm connected.

Furthermore, each arm being provided with sensors, it is possible to know its position at any time and thus to avoid trajectories leading to clashes between arms.

This starts, of course, from the hypothesis that the manifold targets of the ship to which the arms are connected, are disposed at substantially the same height with respect to the deck of the ship.

If this is not the case, or alternatively in order to accelerate the connection process, the PLC 22 can pre-position the coupler 17 at a predetermined height above the target 28 on the basis of information communicated by a transponder disposed on this target. Through these provisions, the coupler 17 can be brought directly to an acquisition position of the target 28, that is lower than position B of FIG. 6B.

Many other variants are possible according to circumstances and in this regard it is recalled that the present invention is not limited to the examples described and shown.

For example, the loading arm can include one or more transfer lines with two or more sections connected to one another by sealed joints defined above.

It will also be recalled that the control device according to the invention adapts to any articulated loading arm, and that the adaptation of the control device according to the invention to any other type of loading system is within the scope of a person skilled in the art.

The invention claimed is:

1. A marine loading system including:
an articulated fluid transfer arm having a fluid transfer line provided at one of its ends corresponding to a free end, with a coupling system suitable for being connected to a target manifold for fluid transfer, the target manifold and a target located adjacent to the target manifold each having one or more fiducial markers designed to enable a relative position to be determined;
actuators for controlling the movement of the arm in space;
an optical device supported by the coupling system and suitable for transmitting images of the one or more fiducial markers; and a controller configured to:
control the actuators provided on the arm;
calculate a movement trajectory of the arm towards the target manifold on the basis of the images of the one or more fiducial markers of the target and of the target manifold transmitted by the optical device, and
generate control instructions determined on the basis of the calculated trajectory and transmitting said instructions to the actuators.

2. The system according to claim 1, wherein the controller is configured to generate and transmit predefined control instructions in order to produce a first approach of the arm towards the target manifold along a systematic trajectory intended to enable the optical means to detect the target and the target manifold, optionally by being suitable for interacting with a transponder disposed on the target.

3. The system according to claim 1, wherein, in order to calculate the movement trajectory, the controller is configured to successively calculate the relative position of the coupling system with respect to the target, then the relative position of the coupling system with respect to the target manifold.

4. The system according to claim 1, wherein the one or more fiducial markers of the target manifold comprise one or more fiducial markers disposed on a flange of the target manifold or a figure formed by concentric circles externally and internally limiting the joint face of a flange of the target manifold.

5. The system according to claim 1, wherein the free end of the arm includes a fiducial marker arranged to enable a verification of the calibration of the optical device.

6. The system according to claim 1, wherein the fiducial marker is a binary square fiducial marker designed to enable a relative position determination with 3 degrees of freedom or a relative position and relative orientation determination with 6 degrees of freedom.

7. The system according to claim 1, wherein the target includes a retroreflective panel on which the one or more fiducial markers of the target are disposed.

8. The system according to claim 1, wherein the optical device is mounted on the free end of the arm, under the coupling system.

9. The system according to claim 1, wherein the optical device includes a digital camera.

10. The system according to claim 9, wherein the digital camera is provided with a fixed neutral density filter or an electronic variable neutral density filter and/or a polarising filter.

11. The system according to claim 1, wherein the arm is provided with at least one, optionally dimmable, lighting projector, mounted on the arm beside the optical device.

12. The system according to claim 11, wherein the arm is provided with two lighting projectors, arranged either side of the optical device and forming upper and lower lighting cones of the field of view of the optical device.

13. A method for controlling the movement of at least one articulated fluid transfer arm towards a target manifold, for connection thereto, including the steps of:
taking views of tracking means present on the target manifold to which a coupling system of the articulated fluid transfer arm is intended to be connected and on a target located adjacent to the target manifold;
calculating the relative position of the target with respect to the target manifold on the basis of images of the target and target manifold tracking means; —calculating a movement trajectory of the arm towards the target manifold on the basis of images from the target tracking means; and generating and transmitting control instructions enabling the movement of the arm towards the target manifold to be controlled.

14. The method according to claim 13, wherein the coupling system is pre-positioned at a predetermined height above the target on the basis of information communicated by a transponder disposed on the target.

15. The method according to claim 13, which comprises a control step, before the view taking step, of movement of the arm along a systematic trajectory intended to enable the detection, by the optical means, of the target previously positioned adjacent to the target manifold.

16. The method according to claim 15, wherein the systematic trajectory comprises at the end of the trajectory, for a first fluid transfer arm, an approach movement substantially descending from the coupling system towards the target associated with the first arm and, for a second arm, a substantially lateral approach movement towards a target associated with the second arm.

*     *     *     *     *